United States Patent
Bächtold et al.

(10) Patent No.: US 7,109,905 B2
(45) Date of Patent: Sep. 19, 2006

(54) DATA DETECTION FOR LOCAL PROBE DATA STORAGE DEVICES

(75) Inventors: Peter Bächtold, Gattikon (CH); Gerd K. Binnig, Wollerau (CH); Giovanni Cherubini, Rueschlikon (CH); Ajay Dholakia, Gattikon (CH); Urs T. Dürig, Rueschlikon (CH); Evangelos S. Eleftheriou, Zurich (CH); Theodor W. Loeliger, Thalwil (CH); Peter Vettiger, Langnau am Albis (CH)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 10/488,340

(22) PCT Filed: Jul. 19, 2002

(86) PCT No.: PCT/IB02/02828

§ 371 (c)(1),
(2), (4) Date: Oct. 20, 2004

(87) PCT Pub. No.: WO03/021592

PCT Pub. Date: Mar. 13, 2003

(65) Prior Publication Data

US 2005/0066107 A1   Mar. 24, 2005

(30) Foreign Application Priority Data

Sep. 3, 2001 (EP) .................... 01121073

(51) Int. Cl.
  *H03M 1/12* (2006.01)
(52) U.S. Cl. ...................... 341/155; 341/139
(58) Field of Classification Search ............ 341/163, 341/135–160
See application file for complete search history.

(56) References Cited

U.S. PATENT DOCUMENTS

| | | | | |
|---|---|---|---|---|
| 3,609,684 A | * | 9/1971 | Lipp | 360/25 |
| 4,103,234 A | * | 7/1978 | Frazier, Jr. | 341/57 |
| 5,241,312 A | * | 8/1993 | Long | 341/163 |
| 5,394,388 A | * | 2/1995 | Hatanaka et al. | 369/126 |
| 6,611,222 B1 | * | 8/2003 | Murphy | 341/155 |

* cited by examiner

*Primary Examiner*—Lam T. Mai
(74) *Attorney, Agent, or Firm*—F. Chau & Associates, LLC

(57) ABSTRACT

Apparatus for detecting data in a sensor signal generated by a read sensor in a local probe data storage device comprises a differentiation for subtracting a value of the sensor signal from the succeeding value of the sensor signal to generate a ternary difference signal; and a convertor connected to the differentiator for converting the difference signal into a binary output signal indicative of the detected data. A local probe data storage device comprising such apparatus is also described.

22 Claims, 11 Drawing Sheets

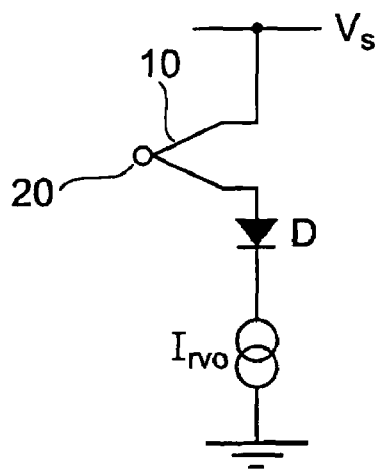
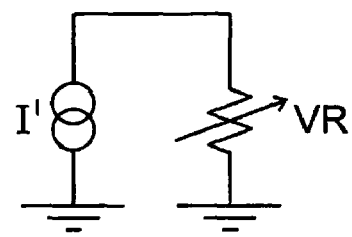
Fig. 2  Fig. 3
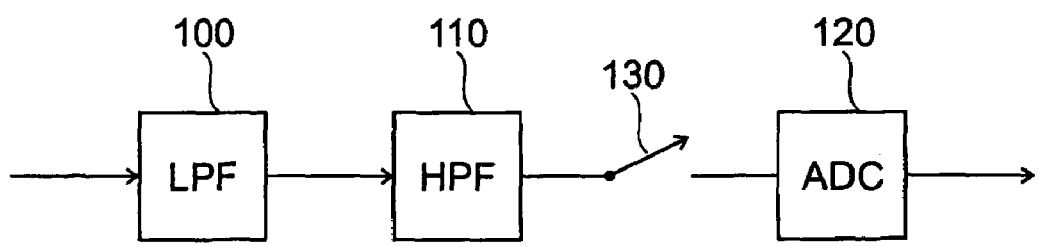
Fig. 4

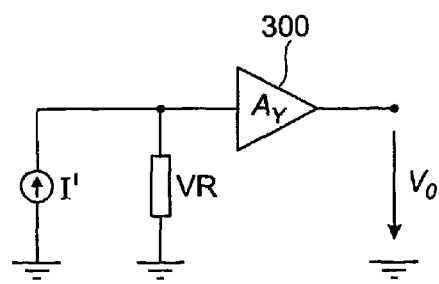 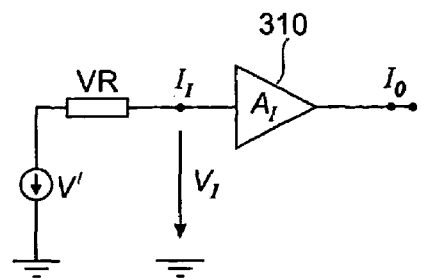
Fig. 12                    Fig. 13
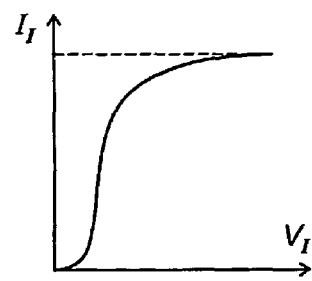
Fig. 14
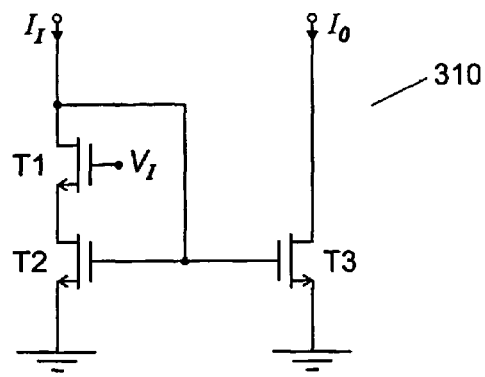
Fig. 15

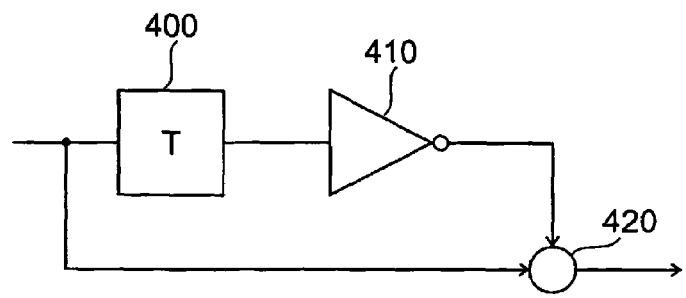
Fig. 19
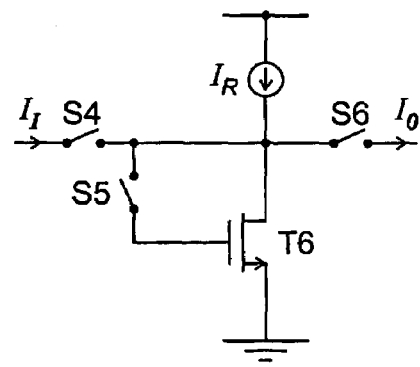
Fig. 20
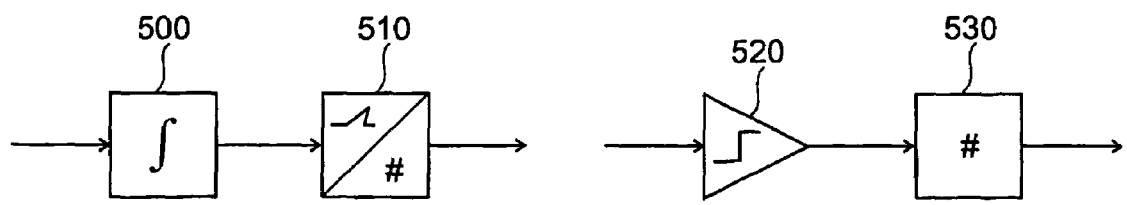
Fig. 21  Fig. 22

DATA DETECTION FOR LOCAL PROBE DATA STORAGE DEVICES

The present invention relates to methods and apparatus for data detection in local probe storage devices.

An example of a local probe storage device is described in *"The "Millipede"*—More than one thousand tips for future AFM data storage", P. Vettiger et al, *IBM Journal of Research and Development*. Vol.44 No.3, May 2000. The Millipede device comprises an array of thermal resistance sensor probes. Such arrays may be employed in the detection of the topography of a surface in applications such as surface visualization and data storage. In the data storage application, data recorded in a surface topography may be read by moving a thermal resistance sensor over the surface and detecting changes in thermal conductance between the sensor and the surface as the distance between the sensor and the surface varies. As described in the aforementioned Vettiger et al. reference, the Millipede device comprises a two dimensional array of cantilever sensors fabricated on a silicon substrate. Each cantilever is attached at one end to the substrate. The other end of each cantilever carries a resistive heater element and an outward facing tip. Each cantilever is addressable via row and column conductors. The row and column conductors permit selective passage of electrical current through each cantilever to heat the heating element thereon. In both reading and writing operations, the tips of the array are brought into contact with and moved relative to a storage medium comprising a polymer film storage surface carried on a plane substrate.

Data is written to the storage medium by a combination of applying a local force to the film via each tip and selectively heating each tip via application of data signals through the corresponding row and column conductors to a level sufficient to locally deform the film, leaving an indentation or pit therein.

Each heating element also provides a thermal read back sensor because it has a resistance which is dependent on temperature. For data reading operations, a heating signal is applied sequentially to each row in the array. The heating signal heats all heating elements in the selected row, but now to a temperature which is insufficient to deform the film. The thermal conductance between the heating elements and the surface varies according to distance between the heating elements and the surface. When a tip move into a pit as the array is scanned across the surface, the distances between the associated heating element and the storage medium reduce. The medium between the heating elements and the surface transfers heat between the heating elements and the storage surface. Heat transfer between each heating element and the surface becomes more efficient when the associated tip moves into a pit. The temperature and therefore the resistance of the heating element therefore reduces. Changes in temperature of the continuously heated heating elements of each row can be monitored in parallel, thereby facilitating detection of recorded bits. A problem associated with such detection is that the signals received from the heating elements may contain unwanted offsets. Another problem associated with such detection is that the signals received from the heating elements may contain noise components. Such unwanted features of the signals received from the heating elements can interfere with bit recovery. Accordingly it would be desirable to provide detection methods and apparatus in which such problems are alleviated.

In accordance with the present invention, there is now provided apparatus for detecting data in a sensor signal generated by a read sensor in a local probe data storage device, the apparatus comprising: a differentiator for subtracting a value of the sensor signal from the succeeding value of the sensor signal to generate a ternary difference signal; and a convertor connected to the differentiator for converting the difference signal into a binary output signal indicative of the detected data. This advantageously prevents offsets in the sensor signal from interfering with recovery of the data. The differentiator effectively acts as a high pass filter.

A low pass filter may be connected to the differentiator for filtering the sensor signal prior to the sensor signal reaching the differentiator. This advantageously eliminates unwanted high frequency noise components from the input to the differentiator.

In particularly preferred embodiments of the present invention, a subtracter is connected to the low pass filter for subtracting a reference signal generated by a reference sensor from the sensor signal prior to the sensor signal reaching the low pass filter. This advantageously reduces dynamic range demand at the input to the low pass filter.

In an embodiment of the present invention which is particularly preferred in the interests of simplicity the differentiator comprises a memory for storing the value of the sensor signal to be subtracted from the succeeding value of the sensor signal and a subtracter connected to the memory for subtracting the value of the sensor signal stored in the memory from the succeeding value to generate the ternary difference signal. In the interests of further simplicity, the subtracter preferably comprises an inverter for inverting the value of the sensor signal stored in the memory to generate an inverted value and an adder connected to the inverter for adding the inverted value to the succeeding value of the sensor signal to generate the ternary difference signal.

The convertor preferably converts the extremities of the ternary difference signal into a first value of the binary output signal and converts the intermediate value of the ternary difference signal into a second value of the binary output signal. Again, In the interests of simplicity, the convertor preferably comprises an integrator for generating a ramp having a slope dependent on the value of a sample of the ternary difference signal and a counter connected to the integrator for determining the binary output in dependence on the time taken for the ramp to reach a preset threshold level.

It will be appreciated that the present invention extends to a local probe data storage device comprising: a storage surface; a read sensor moveable relative to the storage surface in a plane parallel to the storage surface for generating a sensor signal in dependence on data stored in the surface in the form of topographical features thereof; and apparatus as hereinbefore described connected to the sensor for detecting the data in the sensor signal generated by the read sensor as the read sensor is moved relative to the storage surface.

The present invention also extends to a local probe data storage device comprising a read sensor moveable relative to the storage surface in a plane parallel to the storage surface for generating a sensor signal in dependence on data stored in the surface in the form of topographical features thereof; a reference sensor for generating a reference signal in dependence on a reference point in the surface; and apparatus as claimed in any claim dependent on claim 3 connected to the read sensor and the reference sensor for detecting the data in the sensor signal generated by the read sensor as the read sensor is moved relative to the storage surface.

Preferably, local probe storage devices embodying the present invention further comprise a precoder for precoding data to be written onto the storage surface, the precoder comprising an exclusive or gate having an output determined for each bit of an input bit stream to be recorded onto the storage surface in dependence on the value of the bit to be recorded and the value of the output of the exclusive or gate corresponding to the preceding bit of the input bit stream. Also, it will be appreciated that such a storage device may comprise a plurality of read sensors.

Viewing the present invention from another aspect, there is now provided a method for detecting data in a sensor signal generated by a read sensor in a local probe data storage device, the method comprising: subtracting a value of the sensor signal from the succeeding value of the sensor signal to generate a ternary difference signal using a differentiator; and converting the difference signal into a binary output signal indicative of the detected data using a convertor connected to the differentiator.

Preferred embodiments of he present invention will now be described by way of example only with reference to the accompanying drawings, in which:

FIG. 2 is a simplified circuit diagram of a sensor of the device;

FIG. 3 is a Norton equivalent circuit of the sensor;

FIG. 4 is a block diagram of an example of a detection channel for the sensor;

FIG. 12 is a simplified circuit diagram of a sensor circuit for the device;

FIG. 13 is a simplified circuit diagram of another sensor circuit for the device;

FIG. 14 is a graph of the input characteristic of a preamplifier of the FIG. 13 sensor circuit;

FIG. 15 is a circuit diagram of an example of the preamplifier implemented in CMOS;

FIG. 19 is a block diagram of another example of the high pass filter;

FIG. 20 is a circuit diagram of a memory stage and inverter of the high filter implemented in CMOS;

FIG. 21 is a block diagram of an example of the analog to digital convertor;

FIG. 22 is a block diagram of an implementation of the analog to digital convertor shown in FIG. 21;

Figure 1:
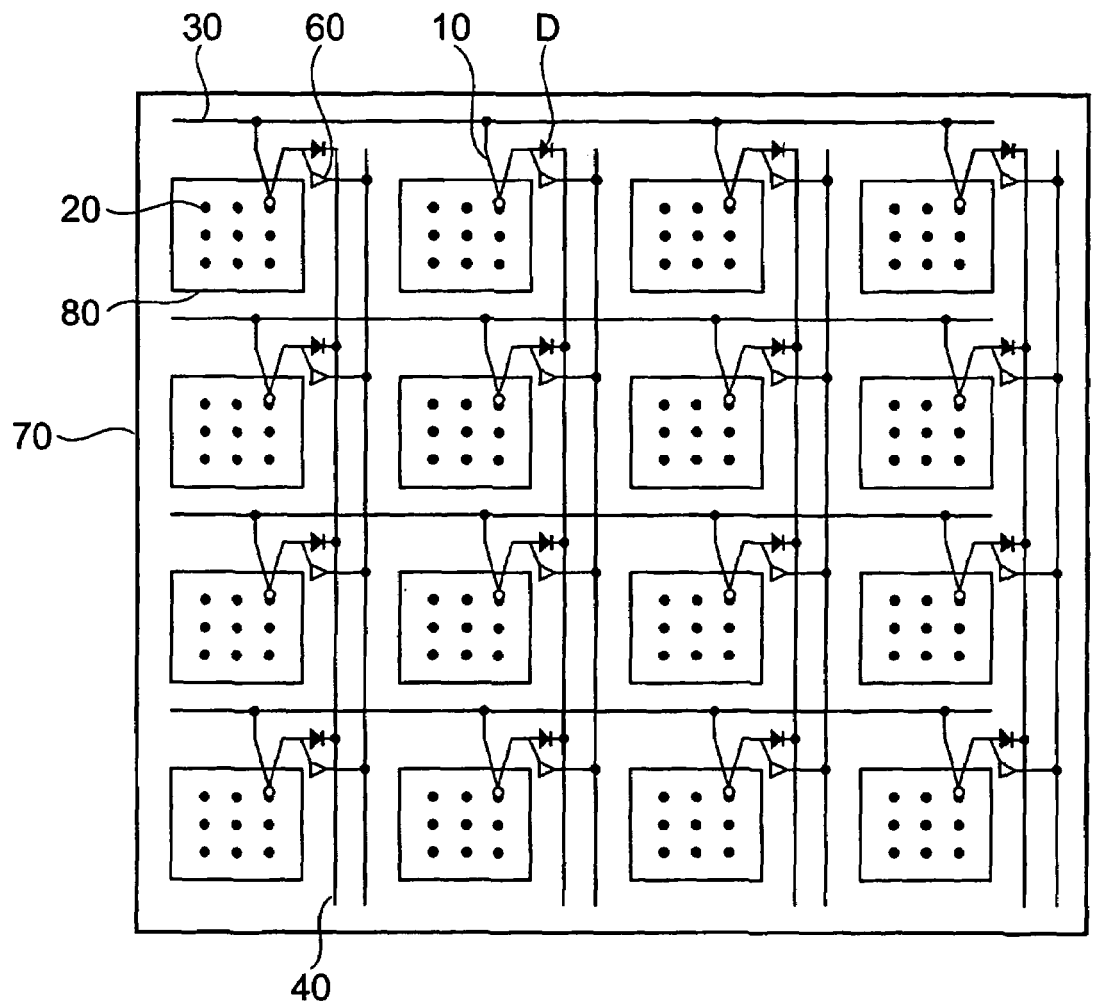
FIG. 1 is a simplified plan view of an example of a local probe data storage device.

Referring first to FIG. 1, an example of a local probe data storage device comprises a two dimensional array of cantilever sensors 10 disposed on a silicon substrate. Row conductors 30 and column conductors 40 are also disposed on the substrate. Each sensor 10 is addressed by a different combination of the row conductors 30 and column conductors 40. There are a pair of row conductors and associated with each column of sensors 10 and one row conductor associated with each row of sensors 10. Each sensor 10 comprises a silicon cantilever structure of a length in the region of 70 micrometers and micrometer thickness. Limbs of the cantilever are fixed, at their distal ends, to the substrate. The apex of the cantilever has freedom for movement in a direction normal to the substrate. The cantilever carries, at its apex, a resistive heater element and a silicon tip facing away from the substrate. The limbs of the cantilever are highly doped to provide a conductive current path. The heater element is formed by doping the apex of the cantilever to a lesser extent, thereby introducing a region of increased electrical resistance to current flow through the cantilever. The current path through the cantilever extends between the associated row conductor and the associated column conductors. One of the column conductors is connected to the cantilever via an intermediate diode D. Specifically, the cathode of the diode D is connected to the column conductor. The other column conductor is connected to the cantilever via a drive circuit 60. The anode of the diode D and the input to the drive circuit 60 are connected to the corresponding row conductor via the heater element. The row conductors 30, column conductors 40, diodes D and drivers 60 are also disposed on the substrate. The cantilevers are pre-stressed to resiliently bias the tips away from the substrate.

In operation, the tip is urged against to a planar storage medium 70 in the form of a polymer layer such as a film of polymethylmethacrylate (PMMA) of a thickness in the region of 40 nm. The polymer layer is carried by a silicon substrate.

Data is written to the storage medium by a combination of applying a local force to the polymer layer 70 via the tip and heating the tip by passing a write current through the cantilever from the corresponding row conductor 30 to the corresponding column conductor 40. Passage of current through the cantilever causes the heater element to heat up. Heat energy is passed from the heater element into the tip via thermal conductance. The write current is selected to heat the tip to a level sufficient to locally deform the polymer layer 70 to leave a pit 20 therein of a diameter in the region of 40 nm. By way of example, it has been found that local deformation of a PMMA film can be achieved by heating the tip to a temperature of the order of 700 degrees centigrade.

The heating element also provides a thermal read back sensor because it has a resistance which is dependent on temperature. For data reading operations, a heating current is passed though the cantilever from the corresponding row conductor 30 to the corresponding column conductor 40. Accordingly, the heating element is again heated, but now to a temperature which is insufficient to deform the polymer layer 70. Reading temperatures of the order of 400 degrees centigrade are, for example, insufficient to deform a PMMA film, but nevertheless provide acceptable reading performance. The thermal conductance between the heating element and the polymer layer 70 varies according to distance between the heating element and the polymer layer 70. When the tip moves into a pit 20 as the array is scanned across the polymer layer, the distances between the heating element and the polymer layer 70 reduce. The medium between the heating element and the polymer layer transfers heat between the heating element and the polymer layer. Heat transfer between the heating element and the polymer layer more efficient when the tip moves in the pit 20. The temperature and therefore the resistance of the heating element reduces. Changes in temperature of the continuously heated heating element can be monitored, thereby facilitating detection of recorded bits.

The aforementioned heating current is produced by applying a heating voltage pulse to the corresponding row conductor 30. Accordingly, a heating current flows through each sensor 10 connected to the row conductor 30 to which the heating voltage pulse is applied. All the heating elements in the corresponding row of the array are therefore heated. Recorded data is then read out from in parallel from the heated row of sensors. Each row of the array is thus read sequentially according to a multiplexing scheme.

The array is moveable relative to the polymer layer in a plane 70 parallel to the polymer layer 70 such that each tip can be scanned over a corresponding field 80 of the polymer layer 70. Each field 80 can accommodate a plurality of pits 20. In both reading and writing operations, the tips of the array are moved across the surface of the storage medium 70.

Referring to FIG. 2, in a preferred embodiment of the present invention, a read/write current flows from a row conductor 30 to which a voltage $V_s$ is applied through a heater element in the corresponding sensor to a lower voltage level applied to the associated column conductor via the diode D. With reference to FIG. 3, this arrangement approximates to a current source I' in series with a variable resistor VR representative of the heater element. The heater element transform the physical value carrying stored information into an electrical signal. The value of variable resistor VR depends on the temperature at the tip. As indicated earlier, during read operation, the tip reaches different temperatures as it moves from the site of a pit (value "1") to the site of no pit (value "0"). A detection circuit for such a system senses a voltage which dependent on the value of the resistance of the heater element and makes a decision as to whether a "1," or a "0" is written at the location of the tip. A "1" produces a relative change in resistance typically of the order of $\Delta R/R=10^{-4}$. An important issue in detecting the presence or absence of a pit is the relatively large resolution desirable to extract a signal containing information indicative of whether the bit is a "1" or a "0". Such detection is complicated by the presence of various offsets such as those produced by manufacturing tolerances. Conventional threshold detection methods are unsuitable because of the relatively high precision in analog to digital conversion they demand and the uncertainty associated with the offset present in the system.

In a preferred embodiment of the present invention, there is provided a robust detection scheme for such thermomechanical sensor arrays as hereinbefore described. The scheme operates in the analog domain. Offsets in the system are obviated by employing three level decision element to be described shortly. The three level decision element avoids the aforementioned processing of signals exhibiting a relatively wide dynamic range. Additionally, a precoding scheme may be employed to avoid error propagation after the three level decision element without incurring rate loss. It will be appreciated from the following detailed description that the detection schemes embodying the present invention are applicable to both current driven and voltage driven thermomechanical sensor systems.

Figure 5:
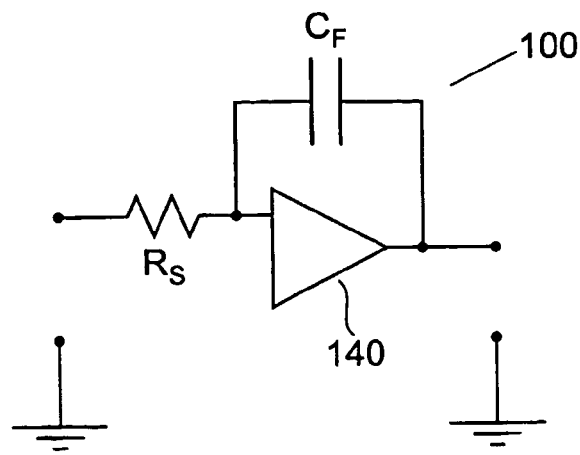
FIG. 5 is simplified block diagram of a low pass filter for the detection channel.
Figure 6:
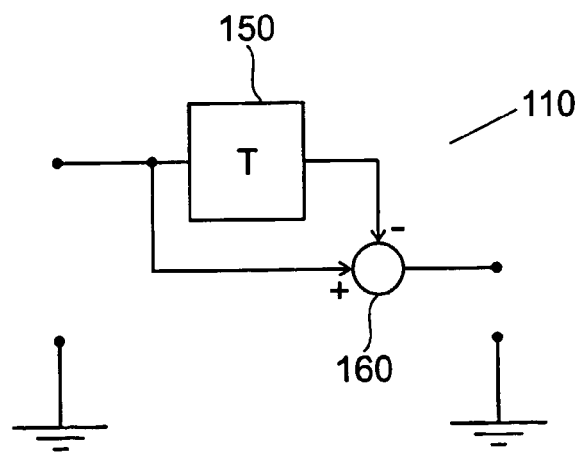
FIG. 6 is a simplified block diagram of a high pass filter for the detection channel.
Figure 7:
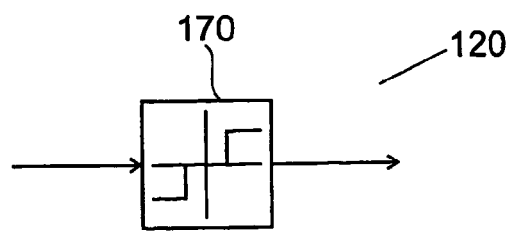
FIG. 7 is a block diagram of an analog to digital convertor for the detection channel.

Referring now to FIG. 4, an example of a detection subsystem embodying the present invention comprises a low pass filter 100 and a high pass filter 110 connected in series. An analog to digital convertor (ADC) 120 is connectable to the output of the high pass filter 110 via a sample and hold switch 120. In operation, the low pass filter 100 limits the bandwidth of high frequency noise in an input signal from a sensor connected thereto. With reference to FIG. 5, the low pass filter 100 comprises an integrator having an virtual earth amplifier 140 with a feedback path comprising a capacitor $C_f$ and an input resistance $R_S$. It will appreciated that such a low pass filter 100 has a transfer function of 1/s, where s is the Laplace operator. Referring to FIG. 6, the high pass filter comprises a differentiator stage having delay stage 150 and a summing block 160. The delay T imposed by the delay stage 150 is set to the interval between two consecutive decisions on bits stored on the storage medium. This interval corresponds to the time required for the sensor to move from one site at which one pit or absence of pit may be written to the next. The summing block 160 thus adds the outputs from the low pass filter 100 corresponding to two consecutive bit read operations. It will be appreciated that such a high pass filter 110 has a transfer function of $1-e^{-sT}$. In operation, the high pass filter eliminates offsets and low frequency noise. The low pass filter 100 and the high pass filter 110 in cascade produce a three level signal at the input to the ADC 120. Referring to FIG. 7, the ADC 120 comprises a three level decision element 170.

Figure 8:
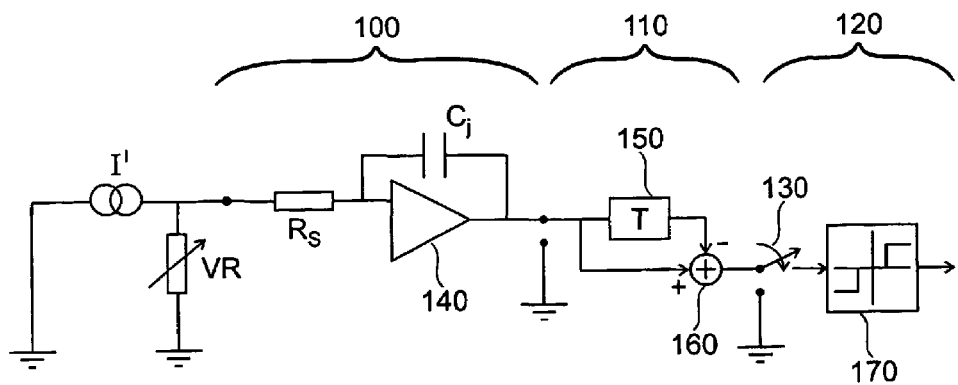
FIG. 8 is a detailed block diagram of the detection channel.

Referring to FIG. 8, a preferred example of a detection channel embodying the present invention for a constant current source sensor arrangement as hereinbefore described with reference to FIG. 3 comprises the low pass filter 100 hereinbefore described with reference to FIG. 5, the high pass filter hereinbefore described with reference to FIG. 6, the switch 130, and the ADC 170 hereinbefore described with reference to FIG. 7.

Figure 9:
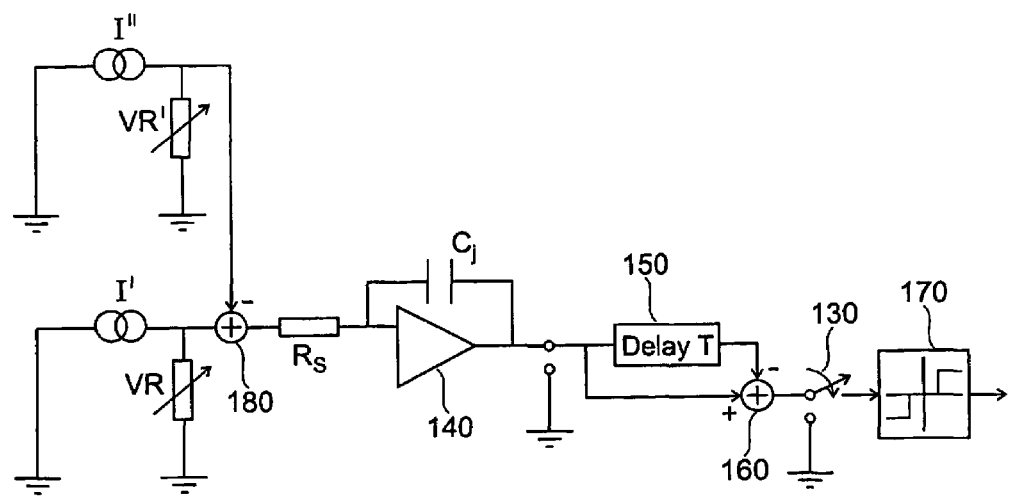
FIG. 9 is a detailed block diagram of a modification of the detection channel.

Referring to FIG. 9, in a modification of the embodiment of the present invention hereinbefore described with reference to FIG. 8, the dynamic range of the signal input to the low pass filter 100 is reduced. This reduction is achieved by taking an output from a reference sensor represented in FIG. 9 by Norton equivalent circuit comprising current source I" and variable resistance VR'. The output from the reference sensor is subtracted from the sensor output of interest by a differencing block 180. A precision reference signal is not required because the high pass filter 110 removes any offset that may be present at the output of the low pass filter 100.

It is sufficient that the variation of the reference signal over two consecutive read intervals is negligible with respect to the difference signal from the output of the differencing block 180. The reference signal may be obtained for example from a sensor reading a dedicated field in which all bits are equal to "0".

The detection channels hereinbefore described with reference to FIGS. 8 and 9 are examples of so-called discrete time 1-D channels, where D is the delay. Symbol by symbol detection at the output of a discrete time 1-D channel with a binary input symbol sequence has drawbacks. In the presence of noise, a loss in performance of 2 to 3 dB can be experienced, together with error propagation. The performance loss depends on the noise spectral characteristics.

Figure 10:
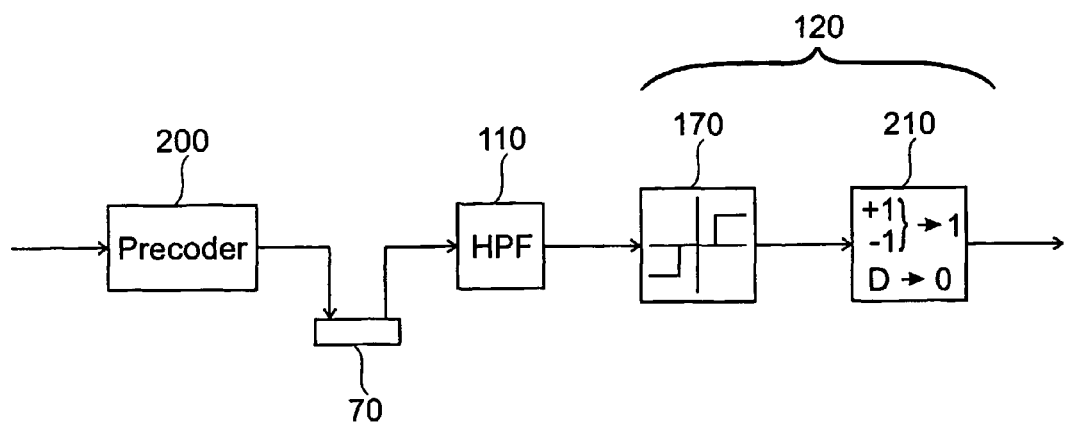
FIG. 10 is a block diagram of a detection channel in which precoding is employed.
Figure 11:
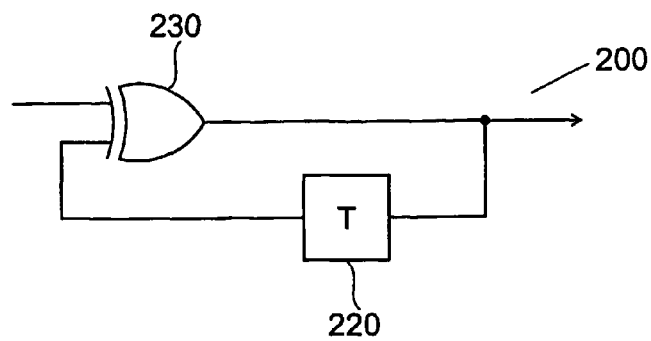
FIG. 11 is a block diagram of a precoder for the detection channel of FIG. 10.

Such losses can be at least partially overcome by maximal likelihood detection of the input sequence. However, maximal likelihood detection requires relatively high complexity. Referring to FIG. 10, in a preferred embodiment of the present invention, a precoder 200 is employed to precode the sequence of information bits to be recorded on the storage medium 70. The precoding eliminates error propagation. The ADC 120 comprises combinational logic 210 for equating a "++1" or "−1" from the output of the high pass filter 110 to a "1" at the channel output and for equating a "0" at the output of the high pass filter 110 to a "0" at the channel output. In general, for $1-D^k$ precoding, a $1/(1 \oplus D^k)$ precoder is employed, where $\oplus$ denotes modulo 2 addition. Referring to FIG. 11, the precoder 200 comprises a delay stage 220 having a delay of T and a summing stage 230. In operation, an information bit to be precoded are input to the summing stage and summed with the output from the summing stage 220 for the preceding information bit. The output from the summing stage is fed back to the summing stage via the delay stage 220.

With reference to FIG. 12, in a preferred embodiment of the present invention, the sensors operate in current mode as hereinbefore mentioned. In other words, each sensor comprises a current source I' driving a sense resistor VR and providing a voltage signal at the output via a voltage follower 300. A range of standard voltage mode circuits can provide accurate detection of such a signal. However, conventional voltage mode circuits have drawbacks. Specifically, such circuits typically require relatively large chip area and exhibit relatively low performance at relatively low supply voltages. These problems are alleviated in the sense circuit shown in FIG. 13. In the FIG. 13 sense circuit is suitable for current mode detection circuits ad array architectures. Specifically, the FIG. 13 circuit comprises a voltage source V' during the sense resistance VR and a limiting preamplifier 310 having an input characteristic as shown in FIG. 14. The preamplifier 310 limits the power dissipation in the sensor circuit and transfers the sensor signal to the subsequent detection circuitry. Referring now to FIG. 15, a simple CMOS implementation of the preamplifier 310 comprises 3 transistors T1, T2, and T3.

Figure 16:
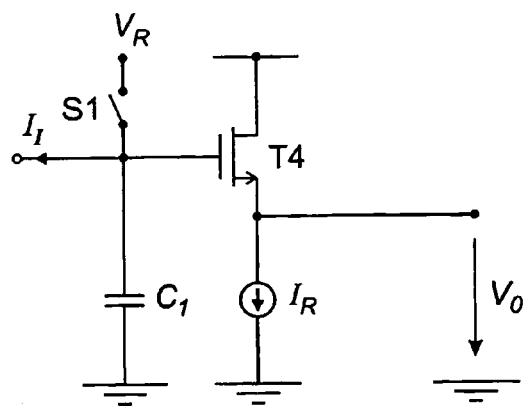
FIG. 16 is a circuit diagram of an example of the low pass filter implemented in CMOS.
Figure 17:
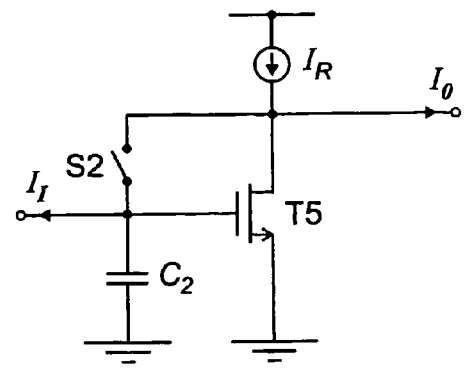
FIG. 17 is a circuit diagram of another example of the low pass filter implemented in CMOS.
Figure 18:
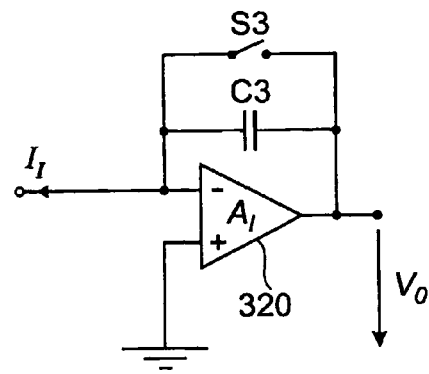
FIG. 18 is a bloc diagram of another example of the low pass filter.

An integrator for voltage mode of operation by a passive integrator or by an active integrator. FIG. 16 shows an example of a passive integrator circuit in a CMOS implementation comprising transistor T4, capacitor C1 and switch S1. FIG. 18 shows an example of an active integrator circuit comprising a virtual earth amplifier 320, a capacitor C3 and a switch S3. FIG. 17 shows a CMOS implementation of an integrator circuit for current mode of operation comprising transistor T5, capacitor C2 and switch S2. The integrator shown in FIG. 17 is a transintegrator circuit. In general, the low pass filter 100 may be implemented by any one of a variety of approaches, including RC filters, MOSFET filters, transconductance-C (gm-C, OTA-C) filters, switched capacitor filters and current switched filters. In the circuits hereinbefore described with reference to FIGS. 16, 17, and 18, each of switches S1, S2, and S3 permit the corresponding integrator to be periodically reset. Resetting of such integrators will be described in detail shortly.

As indicated earlier, the differentiator circuit of the high pass filter 110 subtracts a previous signal value from a present signal value to provide an approximation of the derivative of the information signal. Referring now to FIG. 19, in a preferred embodiment of the present invention, the high pass filter 110 comprises a memory element 400 having an output connected to an inverter gate 410. The output of the inverter gate 410 and the input to the memory element 400 are connected to the input of a summing stage so that the output of the summing stage produces the value equal to the difference between two consecutive information bits. FIG. 20 shows a current mode CMOS implementation of the memory element 400 and the inverter 410 comprising an inverting memory cell based on a switched current transistor memory cell having transistor T6, and switches S4, S5, and S6. The summing stage 410 for the current mode of operation can be implemented simply by a wired node connection. High pass filter approaches such as RC filters, MOSFET filters, transconductance-C (gm-C, OTA-C) filters, switched capacitor filters and current switched filters have limitation similar to those hereinbefore described with reference to the low pass filter 100. It will be appreciated that switches S1–S6 may be implemented by pass transistors in VLSI embodiments of the present invention.

Figure 23:
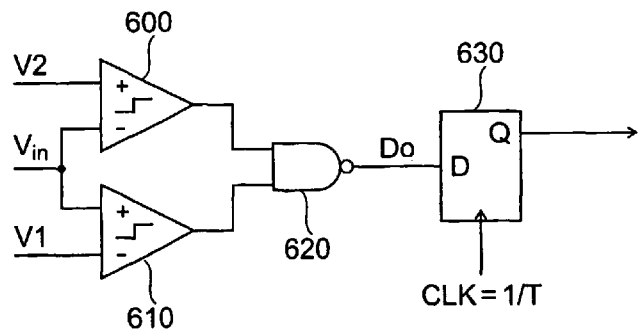
FIG. 23 is a block diagram of another implementation of the analog to digital convertor.

As mentioned earlier, in preferred embodiments of the present invention, the ADC 120 has a resolution of three levels for the detection of the information signal. Referring now to FIG. 21, in a preferred embodiment of the present invention, the ADC 120 comprises an integrator 500 connected to a ramp analog to digital convertor (RADC) 510. The integrator 500 may for example be of any of the forms hereinbefore described with reference to FIGS. 16, 17 and 18. In operation, the integrator 500 is periodically reset in synchronization with input bits of the ternary output from the high pass filter. For each input bit, the integrator 500 generates a ramp. The slope of the ramp is dependent on the value of the input bit. The RADC 510 measures the slope of the ramp signal by determining the time for the ramp to reach a preset threshold level. Referring now to FIG. 22, in a particularly preferred embodiment of the present invention, the RADC 510 is implemented by a comparator 520 preset to the aforementioned threshold level and a counter 530. With reference to FIG. 23, a modification to the preferred embodiment of the present invention hereinbefore described with reference to FIG. 22 combines three level ADC and inverse precoder functions. In operation, a pair of comparators 600 and 610 each receive the bit stream to be decoded. Comparator 600 compares the bit stream to a first voltage level V1. Comparator 610 compares the bit stream to a second voltage level V2. The outputs of the comparators are combined via a two input NAND gate 620 to provide a data input to a single D type latch 630 clocked at 1/T. The output of the latch 630 provides the decoded bit stream.

Figure 24:
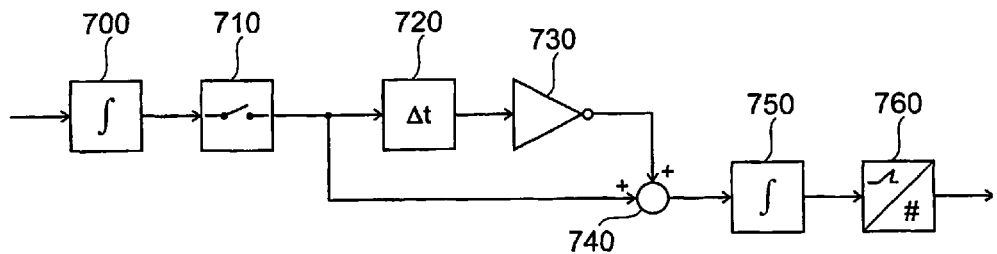
FIG. 24 is a block diagram of an example of the detection channel.

Referring now to FIG. 24, in a preferred embodiment of the present invention there is provided an integrator 700 for integrating two consecutive read back signals for the same fixed integration time. The output of the integrator 700 is sampled by a sample and hold circuit 710. The output of the sample and hold circuit is fed to a differentiator comprising a memory element 720, inverter gate 730 and summing block 740. The differentiator subtracts the current value of the output from the integrator 700 from the preceding value stored in the memory element 730. A second integrator 750 then integrates the resulting value and converts it via the RADC 760. Specifically, the second integrator 750 generates a ramp which is, in turn, compared with a predetermined threshold. The time taken for the ramp to reach the threshold is inversely proportional to the difference between the last two values provided at the output of the sample and hold circuit 710. Thus, in an ideal noiseless case, three possible values of time corresponding to +d, 0, and −d are provided at the output of the RADC 760. In the case of a noisy signal, a continuum of time values is quantized into the aforementioned three values.

Figure 25:
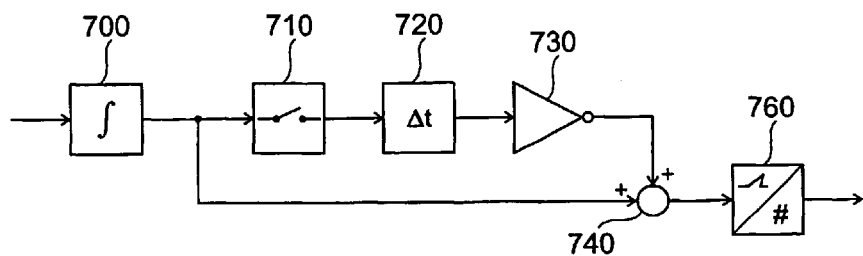
FIG. 25 is a block diagram of another example of the detection channel.

As shown in FIG. 25, integrators 700 and 730 of the FIG. 24 embodiment can be combined. In the FIG. 25, embodiment only the previous signal value is integrated fro a fixed integration time and subsequently stored in the memory cell 720,. The stored value is directly subtracted from the continuously integrated signal value at the output of the integrator 70 upstream of the sample and hold circuit 710. The difference at the output of the adder 740 is then fed to the RADC 760. The integrator 70 in the FIG. 25 embodiment simultaneously provides the signal to be stored in the memory element 720 for the next sample and the signal to be fed to the RADC 760 via the adder 740.

Figure 26:
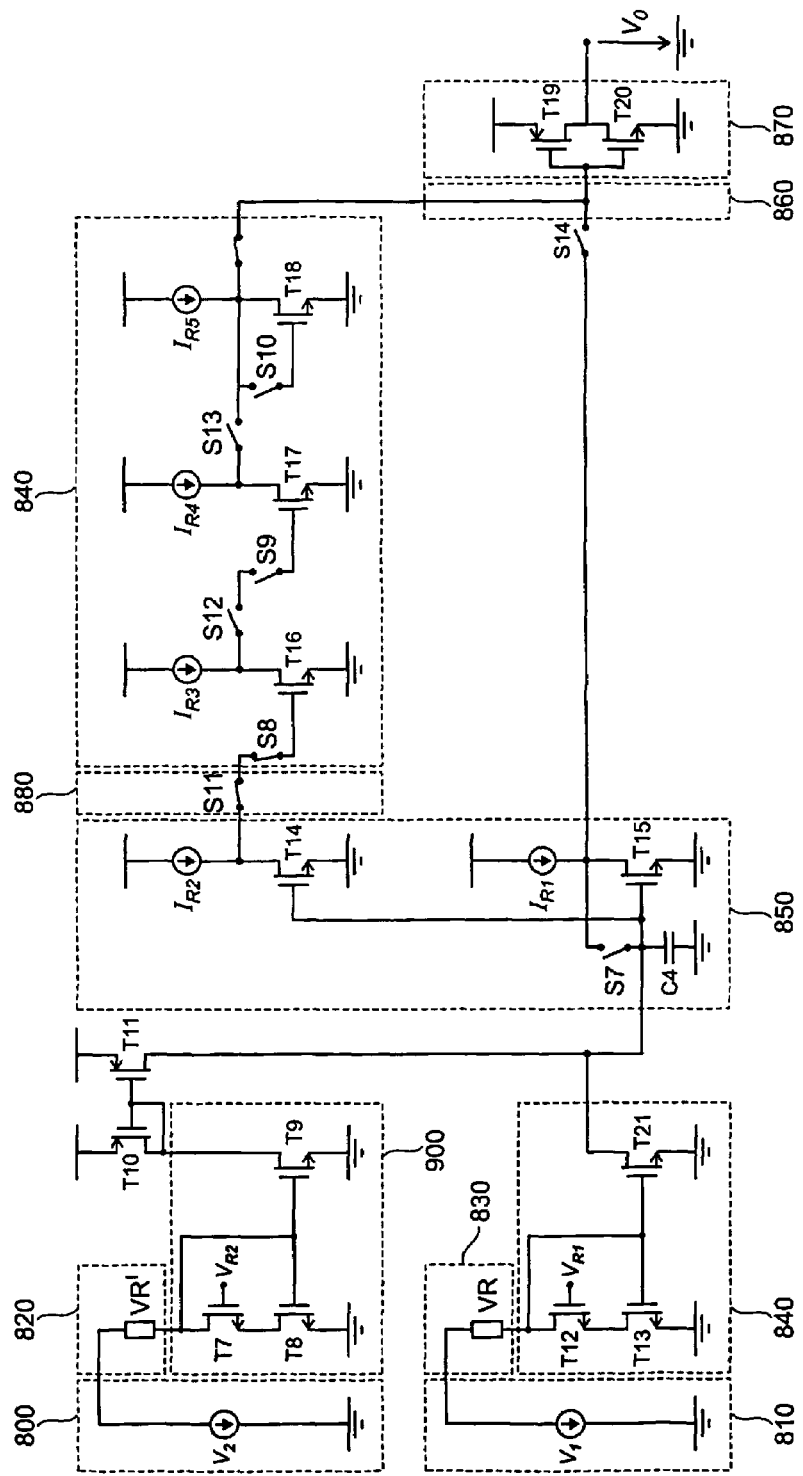
FIG. 26 is a circuit diagram of an example of the detection channel.

With reference to FIG. 26, a particularly preferred embodiment of the present invention comprises a CMOS implementation including a first voltage source 810 connected to a thermomechanical detector under test 830 comprising a variable resistance VR. A second voltage source 800 is connected to reference thermomechanical detector comprising a variable resistance VR'. The detector under test 830 is connected to the input of an integrator 850 via a preamplifier 840 comprising transistor T12, T13, and T21. The reference detector 820 is connected to the input of the integrator 850 via a second preamplifier 900 comprising transistors T7, T8 and T9. In operation, the reference detector 820 functions as hereinbefore described with reference to FIG. 9. The integrator 850 comprises switch S7, capacitor C4, and transistors T14 and T15. The output of the integrator is connected via transistor T14 to a sampler 880 comprising switch S11. The sampler S11 is in turn connected to the input of an inverting memory 890 comprising switches S8, S9, S10, S11, S12, S13 and transistors T16, T17, and T18. The output of the memory 890 is connected to an adder 860 constituted by a circuit node. Also coupled to the adder 860 via transistor T15 and switch S14 is the output of the integrator 850. The output of the adder is connected to a comparator 870 comprising a transistors T19 and T20. The sampler 880, memory 890, and adder 860 collectively constitute a differentiator as hereinbefore described. The comparator 870 constitutes an ADC as hereinbefore described.

Figure 27:
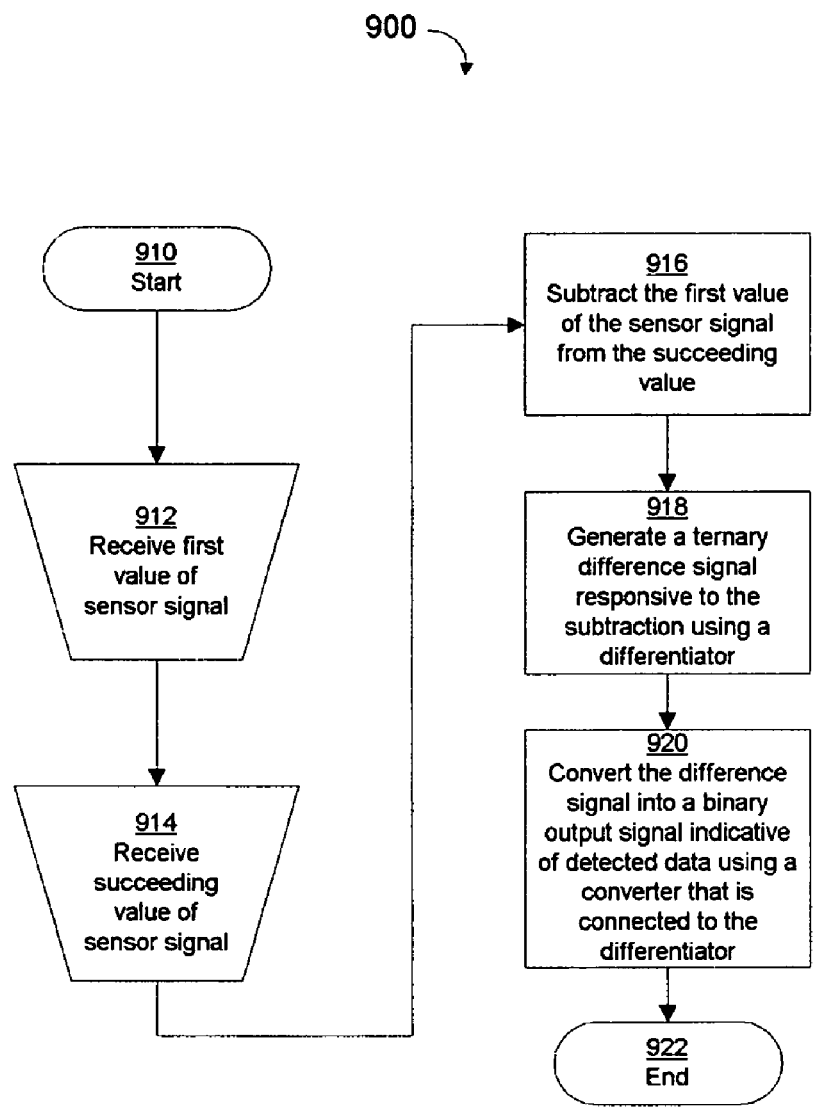
FIG. 27 is a Flow Chart of the invention.

As shown in FIG. 27, a method for detecting data in a sensor signal generated by a read sensor in a local probe data storage device is indicated generally by the reference numeral 900. The method includes a start block 910 that passes control to an input block 912. The input block 912 receives a first value of a sensor signal and passes control to another input block 914. The input block 914 receives a succeeding value of a sensor signal and passes control to a function block 916. The function block 916 subtracts the first value of the sensor signal from the succeeding value of the sensor signal, and passes control to a function block 918. The function block 918 generates a ternary difference signal responsive to the subtraction using a differentiator, and passes control to a function block 920. The function block 920, in turn, converts the difference signal into a binary output signal indicative of detected data using a converter that is connected to the differentiator, and passes control to an end block 922.

In summary, there have been hereinbefore described examples of apparatus for detecting data in a sensor signal generated by a read sensor in a local probe data storage device comprising a differentiator for subtracting a value of the sensor signal from the succeeding value of the sensor signal to generate a ternary difference signal; and a convertor connected to the differentiator for converting the difference signal into a binary output signal indicative of the detected data. A local probe data storage device comprising such apparatus is also described.

The Invention claimed is:

1. An apparatus for detecting data in a sensor signal generated by a read sensor in a local probe data storage device, the apparatus comprising:
   a differentiator for subtracting a value of the sensor signal from a succeeding value of the sensor signal to generate a ternary difference signal; and
   a converter connected to the differentiator for converting the difference signal into a binary output signal indicative of detected data.

2. An apparatus as claimed in claim 1, further comprising a low pass filter connected to the differentiator for filtering the sensor signal prior to the sensor signal reaching the differentiator.

3. An apparatus as claimed in claim 2, further comprising a subtracter connected to the low pass filter for subtracting a reference signal generated by a reference sensor from the sensor signal prior to the sensor signal reaching the low pass filter.

4. An apparatus as claimed in claim 1, wherein the differentiator comprises:
   a memory for storing the value of the sensor signal to be subtracted from the succeeding value of the sensor signal; and
   a subtracter connected to the memory for subtracting the value of the sensor signal stored in the memory from the succeeding value to generate the ternary difference signal.

5. An apparatus as claimed in claim 4, wherein the subtracter comprises:
   an inverter for inverting the value of the sensor signal stored in the memory to generate an inverted value; and
   an adder connected to the inverter for adding the inverted value to the succeeding value of the sensor signal to generate the ternary difference signal.

6. An apparatus as claimed in claim 1, wherein the converter converts the extremities of the ternary difference signal into a first value of the binary output signal and converts the intermediate value of the ternary difference signal into a second value of the binary output signal.

7. An apparatus as claimed in claim 6, wherein the converter comprises:
   an integrator for generating a ramp having a slope dependent on the value of a sample of the ternary difference signal; and
   a counter connected to the integrator for determining the binary output in dependence on the time taken for the ramp to reach a preset threshold level.

8. An apparatus as claimed in claim 1, further comprising:
   a local probe data storage device comprising a storage surface and a read sensor moveable relative to the storage surface in a plane parallel to the storage surface for generating a sensor signal in dependence on data stored in the surface in the form of topographical features thereof; and
   a connection to the sensor for detecting the data in the sensor signal generated by the read sensor as the read sensor is moved relative to the storage surface.

9. An apparatus as claimed in claim 3, further comprising:
   a local probe storage device comprising a storage surface, a read sensor moveable relative to the storage surface in a plane parallel to the storage surface for generating a sensor signal in dependence on data stored in the surface in the form of topographical features thereof, and a reference sensor for generating a reference signal in dependence on a reference point in the surface; and at least one connection to the read sensor and the reference sensor for detecting the data in the sensor signal generated by the read sensor as the read sensor is moved relative to the storage surface.

10. An apparatus as claimed in claim 8, the local probe storage device further comprising a precoder for precoding data to be written onto the storage surface, the precoder comprising an exclusive-or gate having an output determined for each bit of an input bit stream to be recorded onto the storage surface in dependence on the value of the bit to be recorded and the value of the output of the exclusive or gate corresponding to the preceding bit of the input bit stream.

11. An apparatus as claimed in claim 8, the local probe storage device further comprising a plurality of sensors.

12. A method for detecting data in a sensor signal generated by a read sensor in a local probe data storage device, the method comprising:

subtracting a value of the sensor signal from a succeeding value of the sensor signal to generate a ternary difference signal using a differentiator; and converting the difference signal into a binary output signal indicative of detected data using a converter connected to the differentiator.

13. A method as defined in claim 12, further comprising low-pass filtering the sensor signal prior to the sensor signal reaching the differentiator.

14. A method as defined in claim 13, further comprising subtracting a reference signal generated by a reference sensor from the sensor signal prior to the sensor signal reaching the low-pass filter.

15. A method as defined in claim 12, further comprising:

storing the value of the sensor signal to be subtracted from the succeeding value of the sensor signal; and subtracting the value of the sensor signal stored in the memory from the succeeding value to generate the ternary difference signal.

16. A method as defined in claim 15, further comprising:

inverting the value of the sensor signal stored in the memory to generate an inverted value; and adding the inverted value to the succeeding value of the sensor signal to generate the ternary difference signal.

17. A method as defined in claim 12, further comprising:

converting the extremities of the ternary difference signal into a first value of the binary output signal; and converting the intermediate value of the ternary difference signal into a second value of the binary output signal.

18. A method as defined in claim 17, further comprising:

generating a ramp having a slope dependent on the value of a sample of the ternary difference signal; and determining the binary output in dependence on the time taken for the ramp to reach a preset threshold level.

19. A method as defined in claim 12, further comprising:

generating a sensor signal in dependence on data stored in the surface in the form of topographical features thereof; and detecting the data in the sensor signal generated by the read sensor as the read sensor is moved relative to the storage surface.

20. A method as defined in claim 14, further comprising:

generating a sensor signal in dependence on data stored in the surface in the form of topographical features thereof;

generating a reference signal in dependence on a reference point in the surface; and detecting the data in the sensor signal generated by the read sensor as the read sensor is moved relative to the storage surface.

21. A method as defined in claim 19, further comprising precoding data to be written onto the storage surface with an exclusive-or gate having an output determined for each bit of an input bit stream to be recorded onto the storage surface in dependence on the value of the bit to be recorded and the value of the output of the exclusive or gate corresponding to the preceding bit of the input bit stream.

22. A program storage device readable by machine, tangibly embodying a program of instructions executable by the machine to perform program steps for detecting data in a sensor signal generated by a read sensor in a local probe data storage device, the program steps comprising:

subtracting a value of the sensor signal from a succeeding value of the sensor signal to generate a ternary difference signal using a differentiator; and converting the difference signal into a binary output signal indicative of detected data using a converter connected to the differentiator.

* * * * *